United States Patent
Gonidec et al.

[11] Patent Number: 6,145,301
[45] Date of Patent: Nov. 14, 2000

[54] THRUST REVERSER FOR FAN TYPE TURBOJET ENGINES USING INDEPENDENTLY ACTUATED PIVOTED THRUST DEFLECTORS

[75] Inventors: Patrick Gonidec, Montivilliers; Pascal Gérard Rouyer, Saint Aubin Routot; Guy Bernard Vauchel, Le Havre, all of France

[73] Assignee: Societe Hispano-Suiza Aerostructures, France

[21] Appl. No.: 09/121,656

[22] Filed: Jul. 24, 1998

[30] Foreign Application Priority Data

Jul. 24, 1997 [FR] France .................................. 97 09400

[51] Int. Cl.[7] ....................................................... F02K 3/02
[52] U.S. Cl. ....................... 60/226.2; 60/230; 244/110 B; 239/265.27
[58] Field of Search ..................... 60/226.2, 230, 60/232; 239/265.27, 265.29, 265.31; 244/110 B

[56] References Cited

U.S. PATENT DOCUMENTS

| | | | |
|---|---|---|---|
| 3,422,624 | 1/1969 | Brooks et al. | 60/230 |
| 4,074,859 | 2/1978 | Lowman, Jr. | 60/230 |
| 4,216,923 | 8/1980 | Harris | 244/110 B |
| 4,280,561 | 7/1981 | Kutney . | |
| 4,793,134 | 12/1988 | Coplin et al. | 60/226.2 |
| 5,255,510 | 10/1993 | Lardellier | 60/226.2 |
| 5,778,660 | 7/1998 | Jean | 60/226.2 |

FOREIGN PATENT DOCUMENTS

| | | |
|---|---|---|
| 0 690 217 | 1/1996 | European Pat. Off. . |
| 1479131 | 5/1966 | France . |
| 1482538 | 4/1967 | France . |
| 2625261 | 12/1987 | France . |
| 2625261 | 6/1989 | France ................................. 60/226.2 |
| 2650861 | 2/1991 | France . |
| 1946592 | 9/1969 | Germany . |
| 40 39 810 | 12/1990 | Germany . |

Primary Examiner—Ted Kim
Attorney, Agent, or Firm—Bacon & Thomas PLLC

[57] ABSTRACT

A turbojet-engine thrust reverser includes bypass flow deflectors (3) which in a forward thrust mode are retracted into a wall of the primary cowling (4) of the engine and which are driven by linear actuator (6) mounted inside the primary cowling (4) to form an annular flow-deflecting assembly aft of the outlet of the bypass flow duct for producing thrust reversal. Each deflector (3) is independently driven by an actuator (6) and a linkage element (9) into rotation about one or more displaceable pivots (12) which in turn is or are translated by at least one linear actuator along one or more longitudinal guide elements (10). Each actuator (6) is connected to a deflector at the downstream end of the deflector and drives the associated deflector downstream end in an upstream or forward direction, the guide elements extending in a fore and aft direction.

11 Claims, 6 Drawing Sheets

THRUST REVERSER FOR FAN TYPE TURBOJET ENGINES USING INDEPENDENTLY ACTUATED PIVOTED THRUST DEFLECTORS

BACKGROUND OF THE INVENTION

1. Field of the Invention

The present invention concerns a turbojet-engine thrust-reverser, preferably with a high bypass ratio.

2. Description of the Related Art

Turbojet-engines include a primary exhaust duct through which so-called hot propulsive gas flows and an annular duct coaxial with the primary duct through which so-called cold propulsive gas flows. The cold gas flow constitutes the exhaust of a fan located at the intake of the turbojet engine and is a secondary, i.e., bypass flow of the engine. Thrust reversal of the engine is achieved by implementing, mostly or entirely, deflection of the secondary, i.e., bypass flow, in particular when the bypass ratio (i.e., the ratio of bypass to primary exhaust flow) is high.

As regards such applications, it is known to use displaceable components, i.e., baffles or deflectors, which in their extended position can form a continuous annular sub-assembly sealing the bypass duct to deflect the bypass flow and to orient the flow stream while providing thrust reversal. On the other hand, in the forward-thrust mode, the baffles must be retracted and masked while leaving the bypass duct clear for the bypass flow. In some known thrust-reverser models, the baffles are retracted into the radial outer wall of the bypass duct.

Other solutions retract the baffles to the level of the radial inner wall of the bypass duct or enclosing wall, also called the primary cowling, of the inner or central engine. Designs of this type are disclosed in particular in the French patent document A 1,479,131. Various improvements have been proposed in the French patent documents A 2,625,261 and A 2,650,861.

Such designs are especially useful for high bypass ratios and when the radial outer wall of the bypass duct is shorter than the radial inner wall of the bypass duct.

In such a case and according to U.S. Pat. No. 3,280,561 and French patent 2,625,261, the displaceable components, i.e., the baffles, are mounted on the stationary or fixed structure enclosing the engine's gas generator using fixed pivots. The hinge allowing the baffles to pivot may be mounted on the downstream side of the baffle; however, in this case the baffle displacement entails a bypass-duct blocking position which hampers engine operation. Safety problems remain because the baffles are not self-closing. In the event the hinge is placed upstream of the baffle, the jet deflection is implemented by the baffles' outside surfaces; but, this feature precludes optimizing configurations for both reversed and forward thrust modes. Another major drawback of the latter design is the need to use a spoiler or retractable deflector, subject to high stresses, at the ends of the baffles of sufficient size to assure effectiveness.

U.S. Pat. No. 4,216,923 shows a synchronized baffle drive system which requires fitting the assembly with complex and mutually parallel guide and drive means.

Thus, problems remain, taking into account aircraft installation conditions and weight savings, in matching a thrust reverser of this kind to a high bypass-ratio powerplant, while avoiding increasing engine bulk, in particular its outside diameter, and decreasing the ground clearance. Moreover, it must be possible to mount the thrust reverser on a turbojet-engine cowling with the bypass ratio being at least 4. The thrust reverser also must effectively permit the required thrust-reversal performance, and, when in the forward-thrust mode, must provide an aerodynamically continuous inner wall without introducing flow-degrading perturbations.

SUMMARY OF THE INVENTION

In particular, the objective of the invention is to minimize the bypass-duct obstruction presented by the upstream baffle side when the baffle is in the open mode. While assuring operational safety, another objective of the invention is to facilitate the baffle's displacement while also taking into account large axial or radial stresses. Another objective of the invention is design simplicity facilitating implementation and maintenance.

A turbojet-engine thrust reverser of the present invention which achieves the above results while averting the drawbacks of the state of the art is characterized in that each displaceable component, i.e., baffle or deflector, that is driven into the thrust-reversal position, is set into rotation by at least one linkage element about a displaceable pivot. The displaceable pivot is driven into translation by at least one sub-assembly comprising a drive element and a guide element. The drive element drives the baffle at its downstream portion in an upstream direction substantially parallel to the axis of the turbojet engine and aligned with or in the plane of the guide element.

Depending on the application, the guide elements are configured longitudinally, parallel or otherwise relative to the engine axis, with each guide element being straight or comprising one or more curvatures.

BRIEF DESCRIPTION OF THE DRAWINGS

Other features and advantages of the invention are elucidated in the following description of illustrative embodiments of the invention, with reference to the attached drawings; in which.

DETAILED DESCRIPTION OF THE PREFERRED EMBODIMENTS

Figure 1:
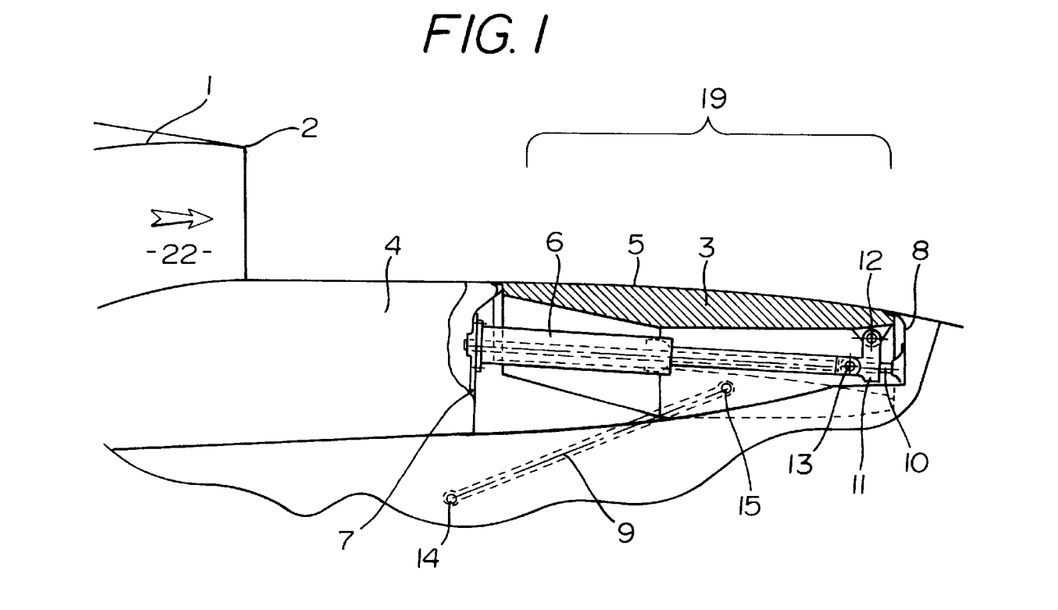
FIG. 1 shows a schematic half-view in longitudinal section of one embodiment of the invention in a plane through the axis of rotation of a turbojet engine and through the center of the thrust baffle or deflector of a thrust reverser in the forward-thrust mode.

In accordance with a preferred embodiment shown in FIG. 1, the invention is mounted downstream of a bypass duct 22 just beyond the downstream end of a trailing edge 2 of a radial outer wall 1 of the duct 22. The stationary structure of a primary cowling assembly 4 enclosing the central engine body comprises a thrust reverser 19 of which the movable portion comprises one or several displaceable components, i.e., baffles or deflectors, 3. There may be two, three, four or more thrust deflectors 3 located just downstream of the bypass duct 22.

Each deflector 3 comprises a main panel of which a radial outer surface 5 assumes a retracted position in the forward-thrust mode in the manner shown and joins at its edges the surface of the primary cowling 4, thereby averting any aerodynamic perturbations in the bypass flow in the bypass duct 22. The stationary structure of the primary cowling 4 may comprise an upstream wall 7 and a downstream wall 8 between which is mounted a longitudinally extending guide element 10 having ends which may be respectively linked to the upstream and downstream walls 7 and 8, or to any other structural member. Preferably, the upstream end is located radially outward relative to the downstream end and relative to the cowling longitudinal axis (not shown) which typically corresponds to the engine longitudinal axis. The guide element 10 axially guides a slider 11 which is linked on one hand by a displaceable pivot 12 to the deflector 3 and on the other hand to an end of a rod of a linear actuator 6 at a pivot 13.

In the embodiment shown in FIG. 1, the linear actuator 6 is mounted in a hinging or stationary manner relative to the upstream wall 7 and is a hollow actuator to allow axial assembly with respect to the guide element 10. This actuator may be single, telescoping, hydraulic, electrical, pneumatic or mechanical.

The linear actuator 6 may be replaced by a screw/nut system, a ball thread system or a roller thread system, in which case the slider then must be fitted with a thread, balls or rollers, respectively.

Moreover, as shown in FIG. 1, the linear actuator 6 is located upstream of the drive point or displaceable pivot 12 of the deflector 3 between the upstream and downstream walls 7 and 8; however, the actuator 6 also may be configured downstream of the drive point, whereby the deflector 3 would be moved by a thrust applied thereto.

At least one linkage rod 9 is rigidly affixed by one of its ends to a pivot point 15 or to the side or to any other intermediate point of the deflector 3. Its other end is rigidly affixed to the stationary structure of the primary cowling 4 at a stationary pivot point 14 which is located either on the upstream wall 7 or on a side wall or beam situated between the deflector 3 or any other location on the stationary structure of the primary cowling 4.

Consequently, the kdnematics of opening the deflectors 3, being implemented by combining the rotation of the linkage rod 9 with the drive motion of the downstream portion of the deflector 3 in the upstream translation direction, makes it possible to assure a distance between the upstream edge of the deflector 3 and the trailing edge 2 of the outer wall 1 which is at least twice the height of the flow section between the trailing edge 2 and the primary cowling 4, thereby minimizing the obstruction of the bypass duct 22.

The slope of each guide element 10 allows optimizing the size of the passage through which the flow in duct 22 moves without degrading engine operation. It will be appreciated that because of the nature of the desired aerodynamic effects, the guide element may slope in the other direction, that is that the downstream end may be outboard away from a cowling axis relative to the upstream end, or it may assume any intermediate position.

Each guide element 10 may be straight or comprise one or several curvatures.

Figure 2:
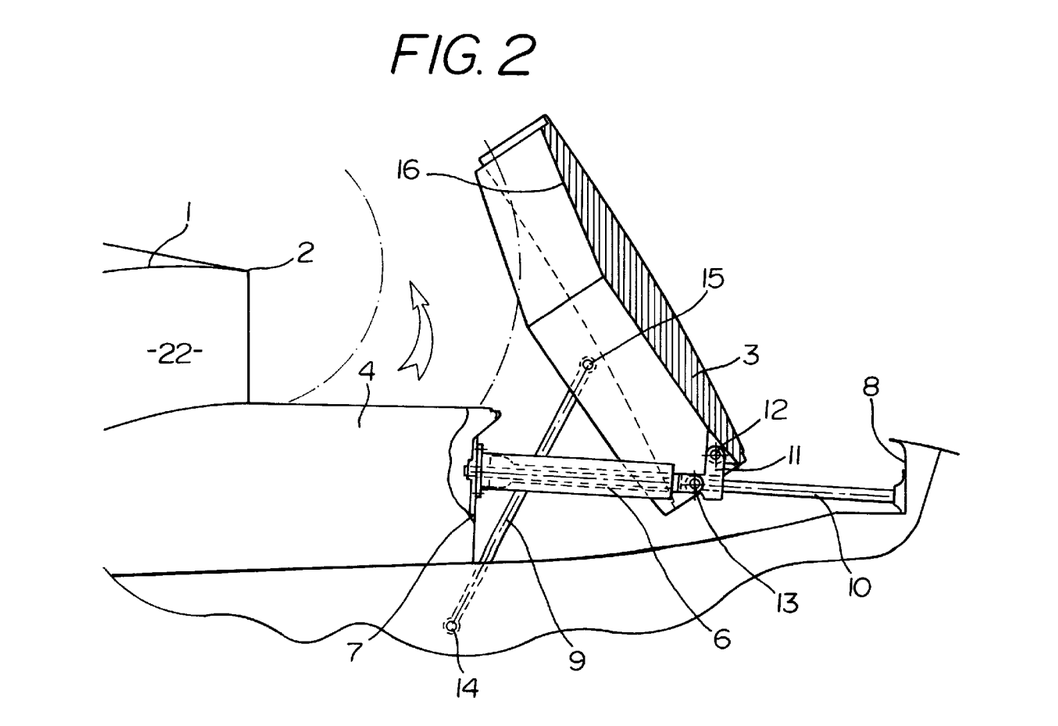
FIG. 2 shows the embodiment of FIG. 1 in the thrust-reversal mode.

FIG. 2 shows the linear actuator 6 driving the deflector 3 from downstream to upstream, its rotation about the displaceable pivot 12 being controlled by the linkage rods 9. If an inner wall 16 of the deflector 3 is appropriately shaped, optimal flow guidance will be possible in the thrust-reversal position. A forward spoiler and side baffles of shape and dimensions matching the desired aerodynamic effects may be added.

Figure 3:
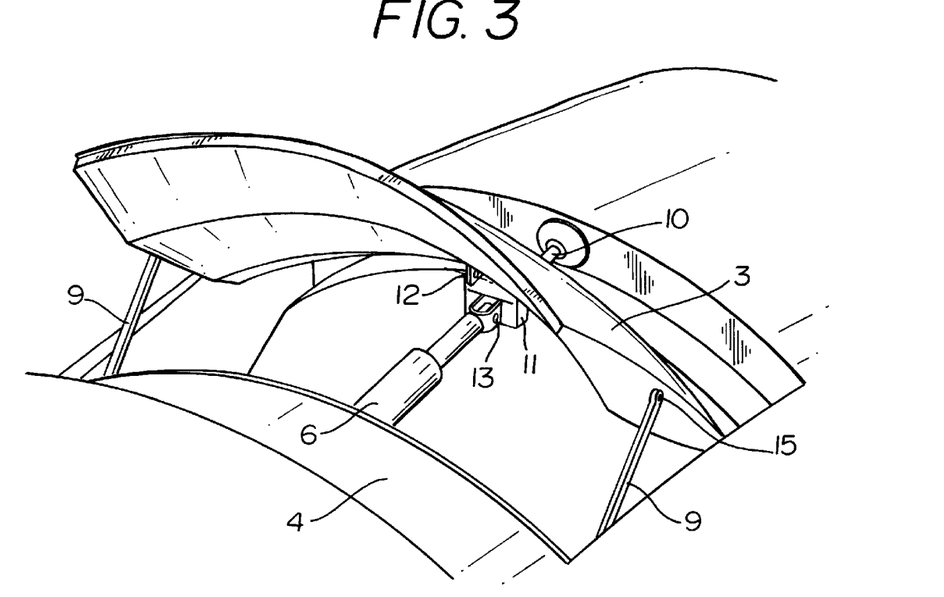
FIG. 3 shows perspective view from the forward end of the embodiment of FIGS. 1 and 2 in an intermediate position between the forward-thrust and the reversed-thrust modes.

FIG. 3 shows a forward perspective view of the above described embodiment in a position intermediate between the forward-thrust and the reversed-thrust positions. In this intermediary position, the actuator 6 and the guide element 10 are mounted at the center of the deflector 3 in a longitudinal radial plane extending through and including the cowling and engine axes.

Figure 4:
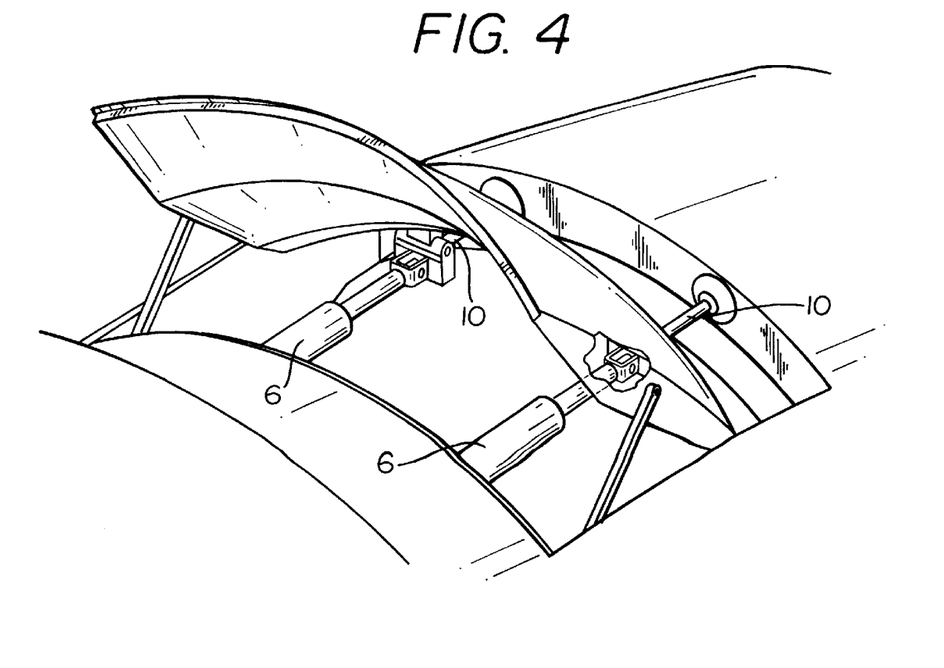
FIG. 4 shows a view similar to that of FIG. 3 of a deflector fitted with two drive-and-guide sub-assemblies.

FIG. 4 shows a view similar to that of FIG. 3 of a deflector 3 fitted with two guides and actuators 10 and 6, respectively, mounted on each side of a central longitudinal plane, between the central plane and a lateral edge of the deflector 3.

Figure 5:
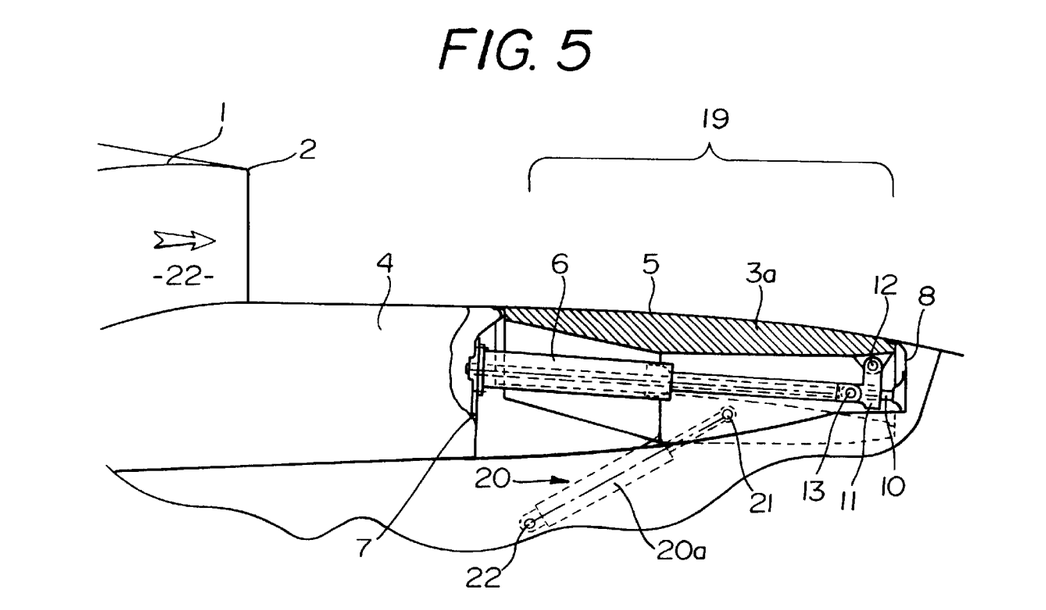
FIGS. 5 and 6 show another embodiment of the invention respectively, in the forward-thrust and reversed-thrust modes, the lateral linkage rods being replaced by one or more linear actuators.
Figure 6:
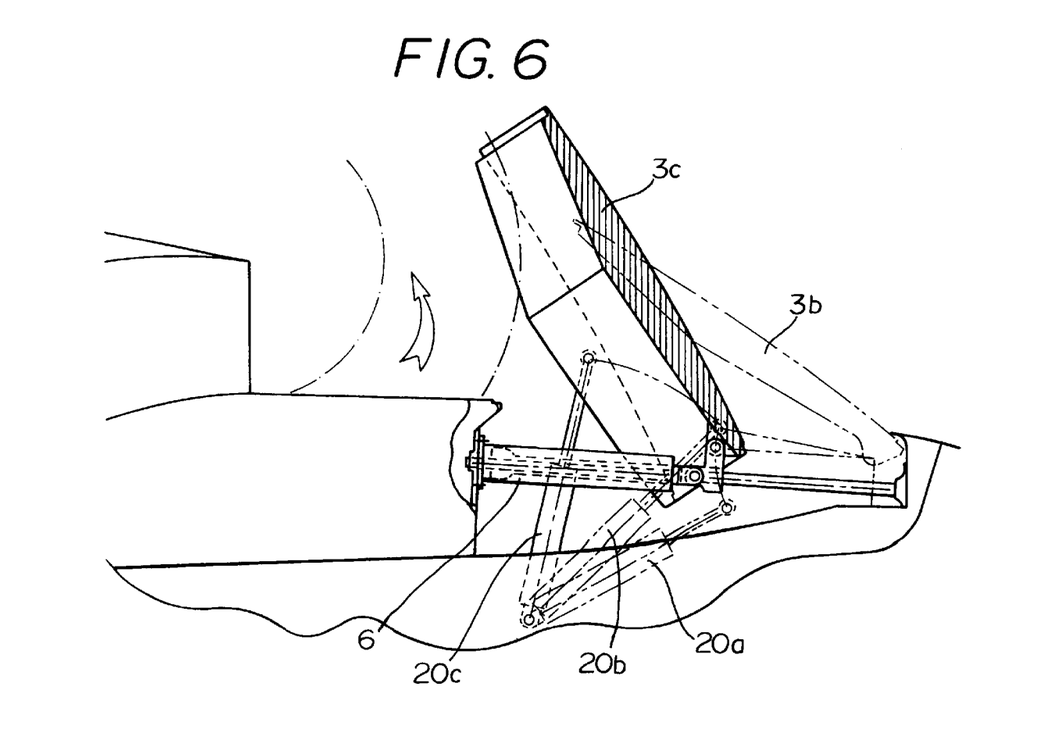

FIGS. 5 and 6 show baffle-opening kinematics different from that described above because the lateral linkage rods 9 have been replaced by one or more linear actuators 20. Each actuator 20 is rigidly affixed by one of its ends to the deflector 3 at a pivot point 21, the other end being rigidly affixed to the stationary structure of the primary cowling 4 at a stationary pivot point 22. The actuator may be electric, pneumatic or hydraulic.

During the opening phase, the linear actuator 20, by a rotation about the displaceable pivot 12, drives the deflector 3 in rotation from a position 3a into a position 3b. When the actuator 20 is at the end of its stroke, corresponding to a position 20b, the main linear actuator 6 is energized, driving the deflector 3 from the position 3b into a position 3c with actuator 20 moving to position 20c. It will be appreciated that other kinematics also are applicable for an opening phase during which the linear actuators 6 and 20 may be simultaneously energized. Moreover, the actuator 20 may be used as a control slider for the actuator 6 to circumvent control-system complexity.

Figure 7:
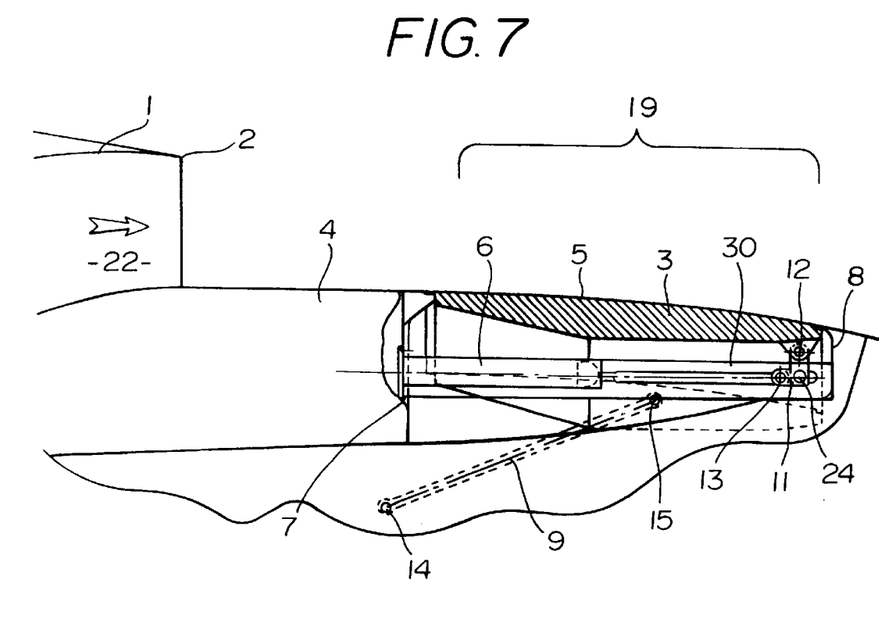
FIGS. 7 and 8 show another embodiment of the invention in the forward-thrust and the reversed-thrust modes, respectively, wherein axial baffle guidance is carried out inside a channel element located around the linear actuator.
Figure 8:
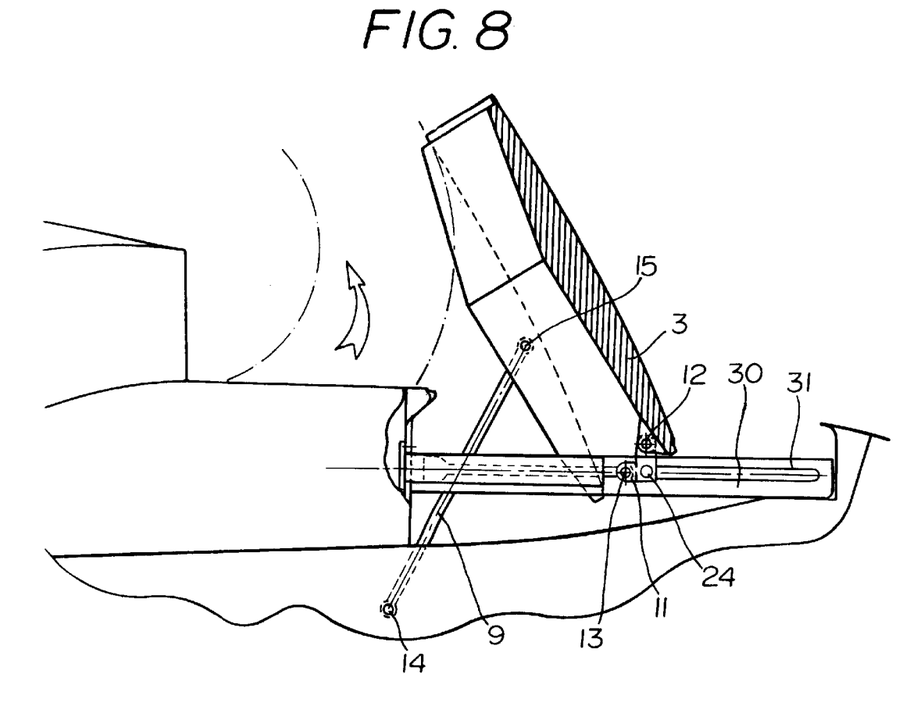
Figure 9:
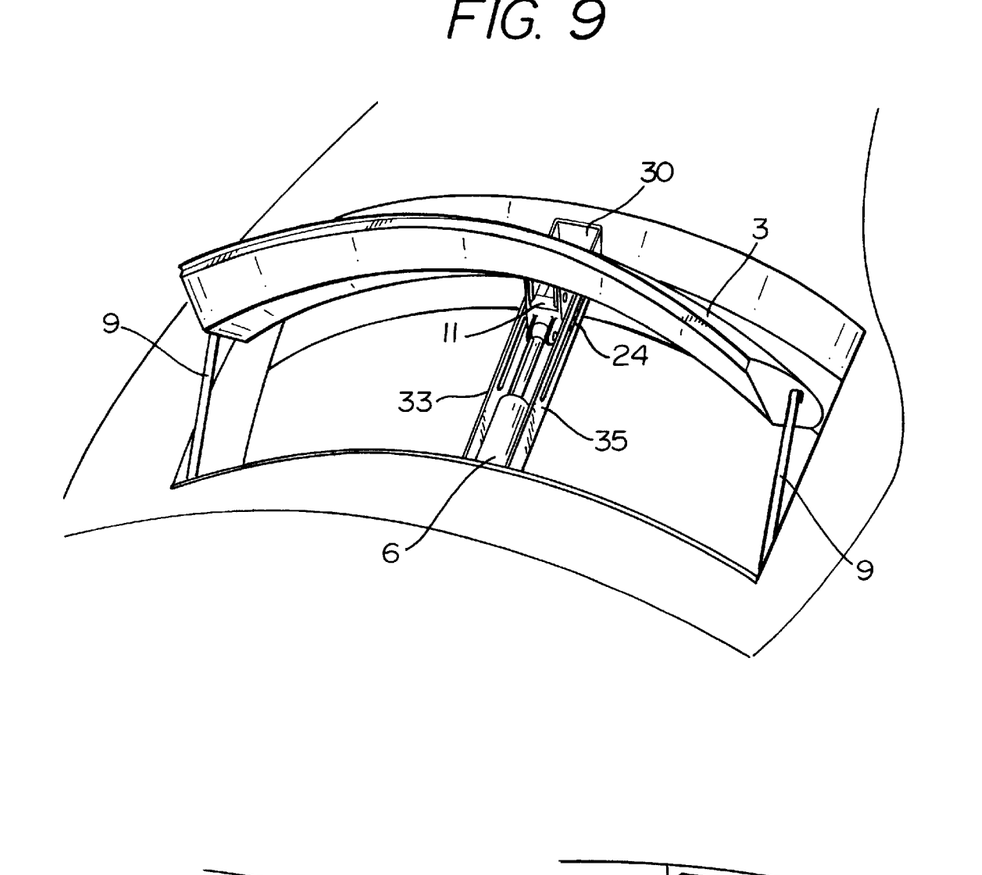
FIG. 9 shows a forward perspective view of the embodiment described in FIGS. 7 and 8 in an intermediate position between the forward-thrust and reversed-thrust modes.

FIGS. 7, 8 and 9 show another embodiment of the invention, the main difference concerning the arrangement of the guide element. In this embodiment, a channel element 30 is connected to the stationary structure of the primary cowling 4 at the level of the walls 7 and 8 and is fitted with longitudinal openings 31 in its side walls 33 and 35 to assure receiving and guiding the slider 11, for example, by one or more rollers 24. In particular, this design allows easier movement of the deflector 3 in the presence of large lateral stresses and may be used in single or double version per deflector 3. The hollow actuator design, in turn, optimizes operation in the presence of large axial stresses. Furthermore, the rollers may be fitted to the deflector's lateral sides, in which case the openings are localized in the side beams.

Figure 10:
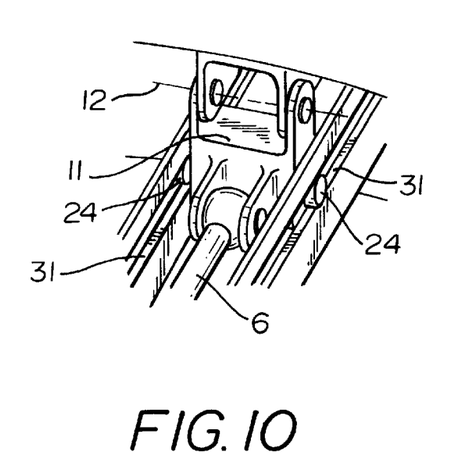
FIGS. 10 and 11 show detailed perspectives of two possible slide guidance means implementing the connection between the deflector and the linear actuator.
Figure 11:
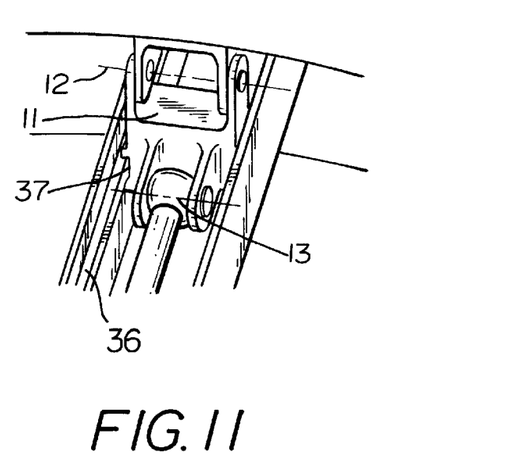

FIGS. 10 and 11 show detailed embodiments each designed to guide the slider 11 inside the channel element 30. FIG. 10 is the guidance mode described above and FIG. 11 shows a variation wherein the slider 11 is fitted with grooves 37 at its sides to guide the slider 11 on and between offsets 36 integrated into the side walls 33 and 35.

These two guidance modes are two of many possible designs known to the designer, based on one or more male parts guided in one or more female parts, and applicable to the present invention.

Figure 12:
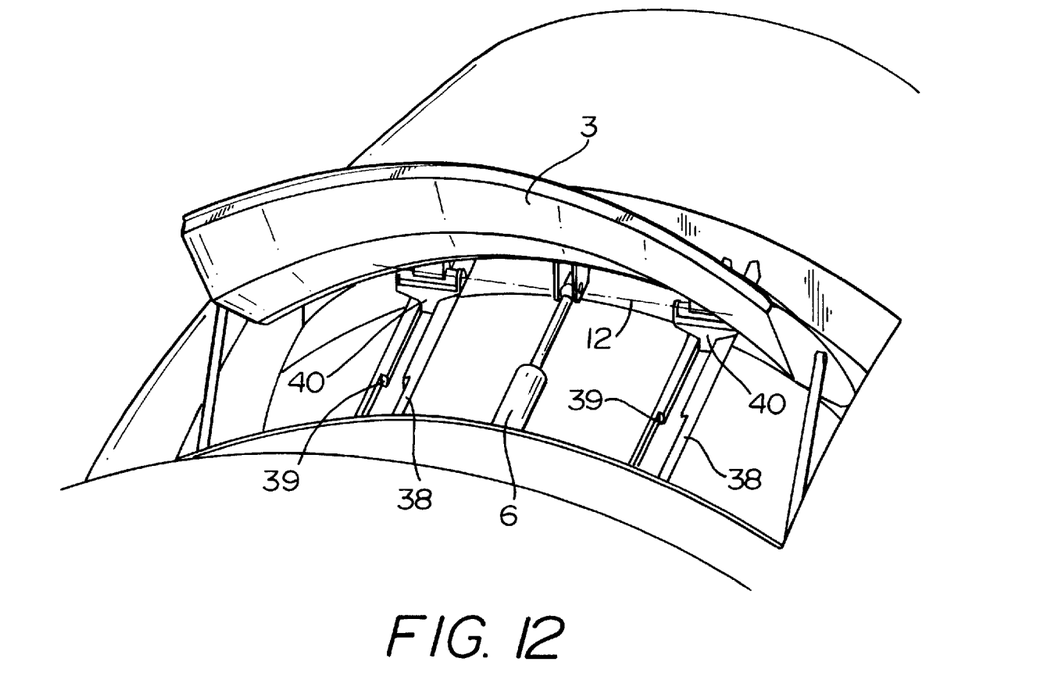
FIGS. 12 and 13 show views similar to FIG. 9 of two embodiments of a deflector fitted with a single central drive element and two guide elements mounted on either side of the drive means.
Figure 13:
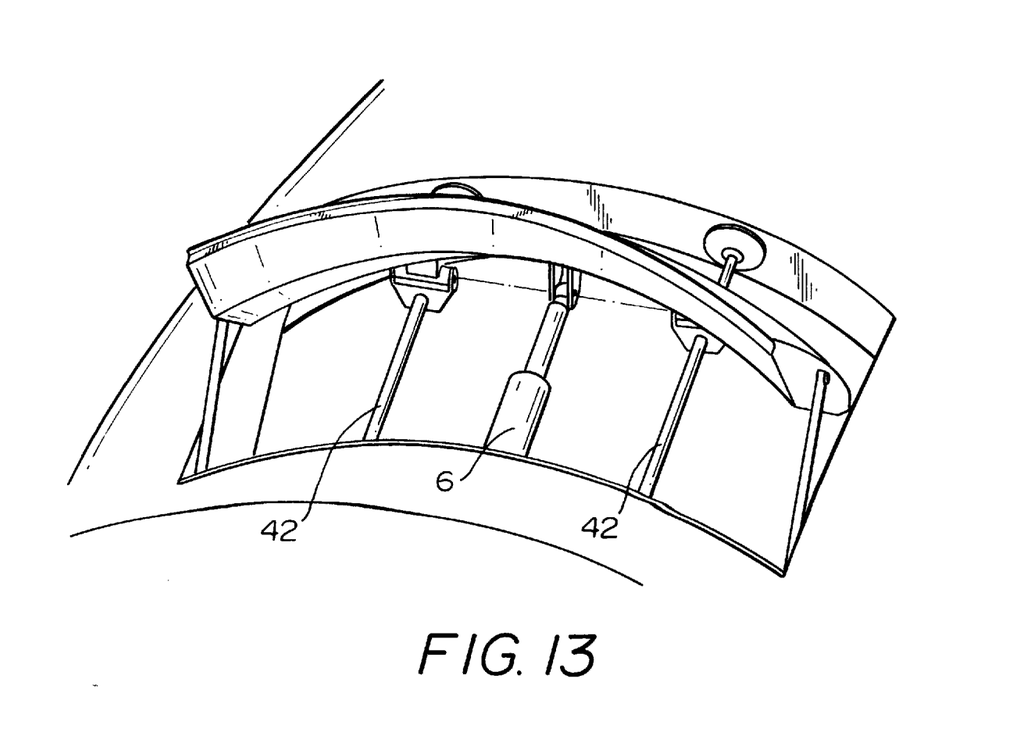

As shown in FIG. 9, the linear actuator 6 and the channel element 30 are mounted in a radial longitudinal plane extending through and including the engine axis and the center of the deflector 3; however, other configurations may be used as shown in FIGS. 12 and 13.

As shown in FIG. 12, the deflectors 3 are each controlled by a single linear actuator 6 mounted centrally of deflector 3 and are axially guided in two slides 38 fitted with channels 39 receiving sliders 40 situated on each side of the actuator. The pivot point of the linear actuator 6 on the deflector 3 can be aligned or not with the displaceable pivot 12 of the sliders 40.

FIG. 13 shows a variation of the embodiment of the slider connection by providing on each side of the central linear actuator 6 two guides 42 which are identical with those described in FIGS. 1 through 4.

It will be appreciated that other systems and/or certain configurations may be used per se or in combination to realize variations without departing from the spirit or scope of the invention. For example:

- the linkage rods 9 may be situated on the sides as shown in the drawings but they also may assume a position intermediate between the above defined position and the center of a respective deflector 3;
- depending on the position of the displaceable pivot 12 in an upstream zone of the deflector 3, the downstream part of the deflector 3 may comprise one cutout per displaceable pivot 12 to allow full excursion of the deflector 3;
- the displaceable pivot 12 may project beyond the downstream end of the deflector 3;
- the casing of the linear actuator 6 may be fully located upstream of the upstream wall 7 of the stationary structure of the primary cowling 4;
- depending on the selected kinematics and the configuration of the drive element, physical contact may be implemented between the deflector 3 and the stationary structure of the primary cowling 4 to provide a seal between them in the reversed-thrust mode depending on the desired aerodynamic effect.

Various modifications to the structure of the preferred embodiments to achieve the same function can be made by the person skilled in the art without departing from the scope of the invention defined by the following claims.

We claim:

1. A turbojet-engine thrust reverser, comprising:
    a fan bypass duct having an outlet and a primary engine cowling assembly having an outer wall and a longitudinal axis, said primary cowling assembly located downstream of the outlet of the bypass duct;
    a plurality of movable thrust deflectors (3) circumferentially spaced about the primary cowling assembly periphery which in a forward-thrust mode are located retracted in a wall of the primary cowling assembly (4), wherein said deflectors (3) are each independently movable relative to the primary cowling assembly and not drivingly connected to another of said thrust deflectors, and each having a downstream portion and an upstream portion;
    each thrust deflector having a displaceable pivot (12) connected to a downstream portion of a respective thrust deflector and at least one pivotable linkage element (9, 20) connecting each of said deflectors (3) to said primary cowling assembly (4) for rotation about its respective displaceable pivot (12);
    at least one linear actuator (6) and at least one guide element (10, 30) located in the primary cowling assembly (4), wherein each actuator and guide element associated with a respective thrust deflector are axially aligned with respect to each another, said at least one linear actuator connected to a respective displaceable pivot (12) of said respective thrust deflector and effecting movement of said displacement pivot (12) along said at least one guide element (10, 30) when actuated;
    each said at least one guide element (10, 30) extending linearly in a fore and aft direction;
    actuation of each linear actuator (6) and displacement of each displaceable pivot (12) along said guide element (10, 30) in a forward direction relative to engine bypass flow further effecting pivotal and translational motion of a respective thrust deflector (3) in cooperation with said at least one linkage element (9, 20) in a thrust reversed position aft of and adjacent the fan bypass duct to deflect bypass flow forwardly.

2. A turbojet-engine thrust reverser according to claim 1, further comprising:
    said primary cowling (4) including an upstream transversely and radially extending wall (7) and a downstream transversely and radially extending wall (8) both rigidly joined to said primary cowling (4); and
    wherein said at least one guide element (10) has an upstream end affixed to said upstream wall (7) and a downstream end affixed to said downstream wall (8).

3. A turbojet-engine thrust reverser according to claim 2, wherein said upstream end is located relatively outward relative to said downstream end and relative to the cowling longitudinal axis.

4. A turbojet-engine thrust reverser according to claim 2, wherein said downstream end is located radially outward relative to said upstream end and relative to the cowling longitudinal axis.

5. A turbojet-engine thrust reverser according to claim 1, wherein said at least one guide element (10) has an upstream end and a downstream end, said upstream end being located radially outward relative to said downstream end and relative to the cowling longitudinal axis.

6. A turbojet-engine thrust reverser according to claim 1, wherein said at least one guide element (10) has an upstream end and a downstream end, said downstream end being located radially outward relative to said upstream end and relative to the cowling longitudinal axis.

7. A turbojet-engine thrust reverser according to claim 1, further comprising:
    rotatable roller elements (24) associated with each displaceable pivot (12);
    wherein said at least one guide element (10) comprises a channel element (30) having opposed side walls (33, 35) each including openings (31) which receive and guide said roller elements (24) along said at least one guide element (10).

8. A turbojet-engine thrust reverser according to claim 1, wherein said at least one linkage element (9, 20) comprises a linkage rod (9).

9. A turbojet-engine thrust reverser according to claim 1, wherein said at least one linkage element (9, 20) comprises a linear actuator (20).

10. A turbojet-engine thrust reverser, comprising:

a fan bypass duct having an outlet and a primary engine cowling assembly having an outer wall, said primary engine cowling having a longitudinal axis and being located downstream of the outlet of the bypass duct;

a plurality of movable thrust deflectors (3) circumferentially spaced about the primary cowling assembly periphery which in a forward thrust mode are retracted into the outer wall of the primary cowling (4), wherein said thrust deflectors (3) are each independently movable relative to the primary cowling assembly and not drivingly connected to another of said thrust deflectors, and each having a downstream portion and an upstream portion;

each thrust deflector having at least one displaceable pivot (12) and at least one pivotable linkage element (9, 20) connecting each of said deflectors (3) to said primary cowling assembly (4) for rotation about its respective displaceable pivot (12);

at least one linear actuator (6) and at least two guide elements (38, 42) connected to the primary cowling assembly (4), wherein each at least one linear actuator and at least two guide elements associated with a respective thrust deflector extend parallel with respect to one another, said at least one displaceable pivot (12) connected to at least one of said guide elements (38, 42) of said respective thrust deflector, said at least one linear actuator connected to and effecting movement of said respective thrust deflector to cause movement of said at least one pivot (12) along at least one of said guide elements (38, 42) when actuated;

each said guide elements extending in a fore and aft direction;

actuation of each linear actuator and displacement of each at least one displaceable pivot (12) along a respective guide element in a forward direction relative to engine bypass flow further effecting pivotal and translational motion of a respective thrust deflector (3) in cooperation with said at least one linkage element (9, 20) in a thrust reversed position aft of and adjacent the fan bypass duct to deflect bypass flow forwardly.

11. A turbojet-engine thrust reverser according to claim 10, wherein a displaceable pivot (12) is connected to each guide element (38, 42) associated with a respective thrust deflector and a downstream portion of the respective deflector (3).

* * * * *

UNITED STATES PATENT AND TRADEMARK OFFICE
CERTIFICATE OF CORRECTION

PATENT NO.    : 6,145,301
DATED         : November 14, 2000
INVENTOR(S)   : Gonidec et al.

Page 1 of 1

It is certified that error appears in the above-identified patent and that said Letters Patent is hereby corrected as shown below:

<u>Title page,</u>
Item [57], ABSTRACT,
Lines 7 and 8, delete "indepen-dently".

<u>Column 3,</u>
Line 59, "kdnematics" should read -- kinematics --.

<u>Column 6,</u>
Line 43, "downstream" should read -- upstream --;
Lines 44 and 48, "upstream" should read -- downstream --;
Line 51, "1" should read -- 2 --.

Signed and Sealed this

Twenty-ninth Day of October, 2002

Attest:

Attesting Officer

JAMES E. ROGAN
*Director of the United States Patent and Trademark Office*